(12) United States Patent
Junior et al.

(10) Patent No.: US 10,190,311 B1
(45) Date of Patent: Jan. 29, 2019

(54) DEVICES AND METHODS TO SEAL GAPS BETWEEN ADJACENT STRUCTURAL PANELS

(71) Applicant: EMBRAER S.A., São José dos Campos-SP (BR)

(72) Inventors: Gabriel Alexandre Nassar Junior, São José dos Campos-SP (BR); Giovanni de Andrade Baldi, São José dos Campos-SP (BR); Lincoln José Raad, São José dos Campos-SP (BR)

(73) Assignee: EMBRAER S.A., São José Dos Campos—SP (BR)

( * ) Notice: Subject to any disclaimer, the term of this patent is extended or adjusted under 35 U.S.C. 154(b) by 0 days.

(21) Appl. No.: 15/659,979

(22) Filed: Jul. 26, 2017

(51) Int. Cl.
*E04B 1/68* (2006.01)
*E04F 15/02* (2006.01)
*B64C 1/18* (2006.01)

(52) U.S. Cl.
CPC ...... *E04B 1/6813* (2013.01); *E04F 15/02016* (2013.01); *B64C 1/18* (2013.01)

(58) Field of Classification Search
CPC ........ E04B 1/68; E04B 1/6812; E04B 1/6813; E04F 15/02005; E04F 15/14; E04F 15/02016; E02D 29/16; E01D 19/06; E01C 11/06; E01C 23/0986; B64C 1/18
USPC .......................................................... 404/87
See application file for complete search history.

(56) References Cited

U.S. PATENT DOCUMENTS

| | | | | |
|---|---|---|---|---|
| 3,200,482 A * | 8/1965 | Brown | ............... | E01C 23/0986 114/224 |
| 3,364,828 A * | 1/1968 | Shope | ................ | E01C 23/0986 29/235 |
| 3,388,643 A * | 6/1968 | Webb | ................... | E01C 11/106 404/40 |
| 3,395,627 A * | 8/1968 | Barton | ............... | E01C 23/0986 404/87 |
| 3,508,474 A * | 4/1970 | Rowe | .................... | E04B 1/6803 404/65 |
| 3,521,528 A * | 7/1970 | Wangerow | ............ | E01C 11/106 277/645 |

(Continued)

FOREIGN PATENT DOCUMENTS

EP     2192068 A2 *  6/2010   .......... B65H 35/002

*Primary Examiner* — Adriana Figueroa
*Assistant Examiner* — Jessie T Fonseca
(74) *Attorney, Agent, or Firm* — Nixon & Vanderhye P.C.

(57) ABSTRACT

Devices and methods are provided whereby a preformed elastomeric tubular seal profile may be installed into a gap defined between an adjacent pair of structural panels. The device may include a frame and opposed first and second compression rollers attached to the frame for rotational movement about respective rotational axes. The opposed first and second compression rollers define a nip space therebetween for the introduction of a preformed elastomeric tubular seal profile, whereby moving the tubular seal profile through the nip space causes the tubular seal profile to compress and thereby form a downstream compressed profile portion and an upstream uncompressed profile portion. The compressed profile portion may thus be inserted into a gap between adjacent structural panels and thereafter allowed to expand (e.g., by removal of a plug element from a distal end thereof) to thereby seal the gap.

13 Claims, 3 Drawing Sheets

(56) References Cited

U.S. PATENT DOCUMENTS

| | | | | |
|---|---|---|---|---|
| 3,538,820 A * | 11/1970 | Tonjes | ............ | E01C 23/0986 29/235 |
| 3,765,784 A * | 10/1973 | Watson | ............ | E01C 11/126 404/64 |
| 3,899,260 A * | 8/1975 | Kerschner | ............ | E01C 11/106 277/645 |
| 4,285,612 A * | 8/1981 | Betti | ............ | E01C 11/04 14/73.1 |
| 4,437,785 A * | 3/1984 | Puccio | ............ | E01D 19/06 277/644 |
| 4,699,540 A * | 10/1987 | Gibbon | ............ | E01D 19/06 404/49 |
| 4,765,771 A * | 8/1988 | Howsley | ............ | B25B 27/0092 180/53.61 |
| 4,799,345 A * | 1/1989 | Rizza | ............ | E04B 1/6813 404/65 |
| 4,861,043 A * | 8/1989 | Anderson | ............ | E02B 3/16 277/312 |
| 5,129,754 A * | 7/1992 | Brower | ............ | E01C 11/10 404/65 |
| 7,090,226 B1 * | 8/2006 | Trainor | ............ | E06B 3/6202 277/630 |
| 2008/0307733 A1 * | 12/2008 | Rice | ............ | E04B 1/6813 52/396.02 |
| 2010/0095620 A1 * | 4/2010 | Wilkes, Jr. | ............ | E04B 1/6812 52/396.04 |
| 2011/0277413 A1 * | 11/2011 | Emmons | ............ | E04B 1/6812 52/514.5 |
| 2015/0042047 A1 * | 2/2015 | Winslow | ............ | F16J 15/022 277/637 |
| 2015/0240503 A1 * | 8/2015 | Scurto | ............ | E04B 5/32 404/69 |

* cited by examiner

DEVICES AND METHODS TO SEAL GAPS BETWEEN ADJACENT STRUCTURAL PANELS

FIELD

The embodiments disclosed herein relate generally to devices and methods whereby gaps between adjacent structural panels may be sealed.

BACKGROUND

It is typically necessary to remove interior floor panels of an aircraft cabin during maintenance and/or refurbishment operations. Removal of such aircraft floor panels will thereby necessarily require removal of the sealant between adjacent panels and the reinstallation of fresh sealant when the panels are reinstalled.

Conventional sealants for the aerospace industry typically include curable two-part sealant materials, such as polysulfide sealants. These sealant materials must be handled and installed carefully in the gaps between floor panels by skilled labor. For example, the sealant components (e.g., base sealant and catalyst) must be mixed carefully to ensure proper cure, applied to clean surfaces and have only a limited amount of working time before curing. The installation of conventional curable sealant materials therefore generally requires substantial preparation prior to use, such as masking adjacent surfaces to the gap to be sealed with tape so to prevent excess material from contamination of such panel surfaces. In addition, several precautions must be taken during installation including the use of solvents (e.g., acetone) and ensuring that suitable protective garments are provided for the workmen installing the sealant, e.g., disposable cloths, gloves and the like.

The installation of conventional aerospace sealants therefore tend to be very labor intensive and thereby costly. It is towards providing a more efficient gap sealant procedure that the embodiments disclosed herein are directed.

SUMMARY

In general the embodiments disclosed herein are directed toward devices and methods whereby a preformed elastomeric tubular seal profile may be installed into a gap defined between an adjacent pair of structural panels. The device according to certain embodiments will therefore include a frame and opposed first and second compression rollers attached to the frame for counter-rotational movement about respective rotational axes. The opposed first and second compression rollers define a nip space therebetween for the introduction of a preformed elastomeric tubular seal profile, whereby moving the tubular seal profile through the nip space causes the tubular seal profile to compress and thereby form a downstream compressed profile portion and an upstream uncompressed profile portion The first compression roller may comprise a pair of raised annular guide bands defining therebetween a recessed annular roller surface for receiving the tubular seal profile, while the second compression roller may comprise a raised central annular guide band which is sized and configured so as to be positioned between the pair of raised annular guide bands of the first roller to thereby close the nip space therebetween.

The frame may be generally rectangular and define an interior space for accommodating the opposed first and second compression rollers. Each of the first and second compression rollers may therefore comprise a respective axle positioned between opposed side walls of the frame to allow for independent rotational movement of the rollers thereabout.

In use, the tubular seal profile may be introduced into a nip space defined between a pair of compression rollers and causing the tubular seal profile to be moved through the nip space to thereby compress the tubular seal profile and form a downstream compressed profile portion and an upstream uncompressed profile portion. The compressed profile portion may then be inserted into a gap defined between adjacent structural panels. Causing the compressed profile portion to expand when installed in the gap between the adjacent structural panels (e.g., by removal of a plug element from the terminal end of the compressed portion) will thereby seal such gap.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION

Figure 1:
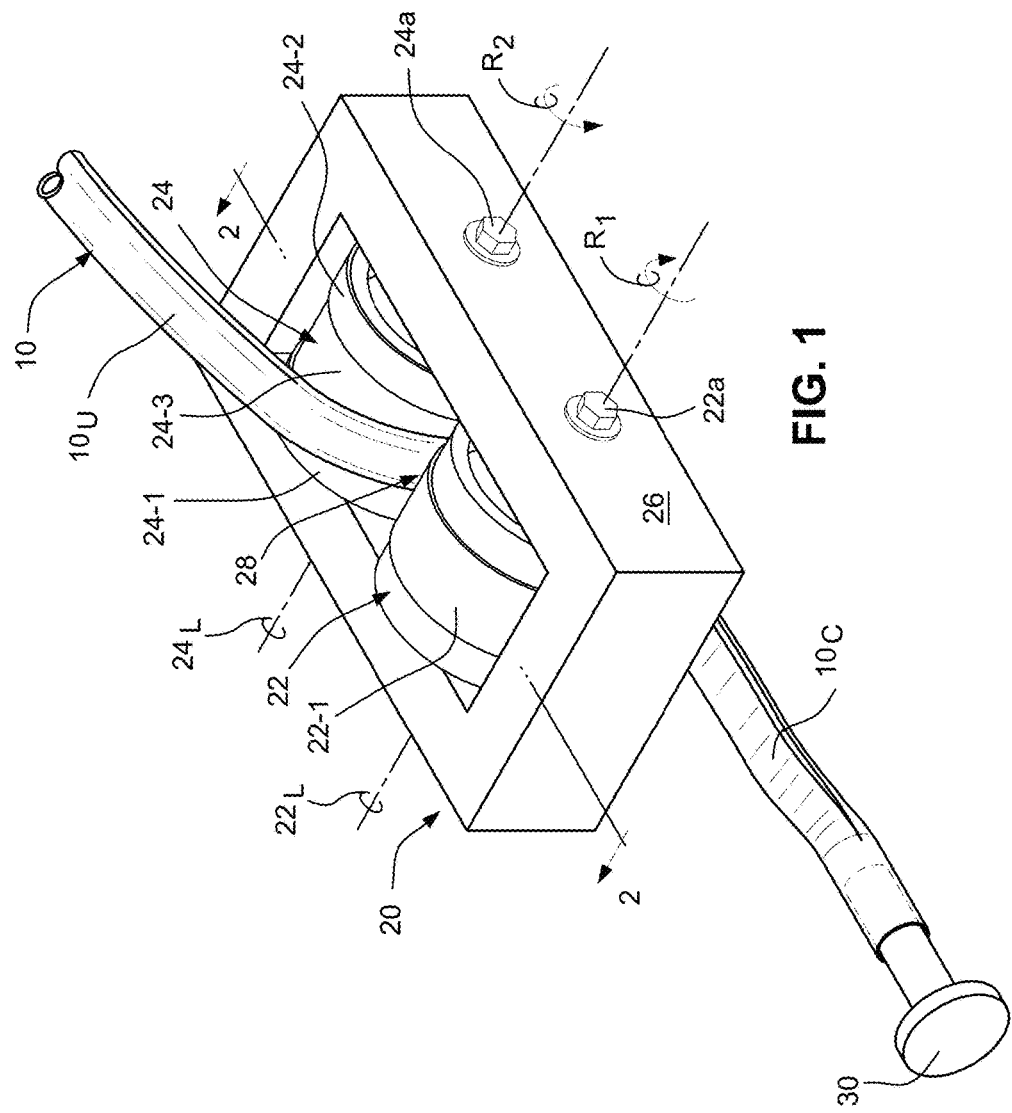
FIG. 1 is a perspective view showing the combination of a preformed tubular seal profile and a device to assist in the installation of the profile in a gap defined between an adjacent pair of structural panels.
Figure 2:
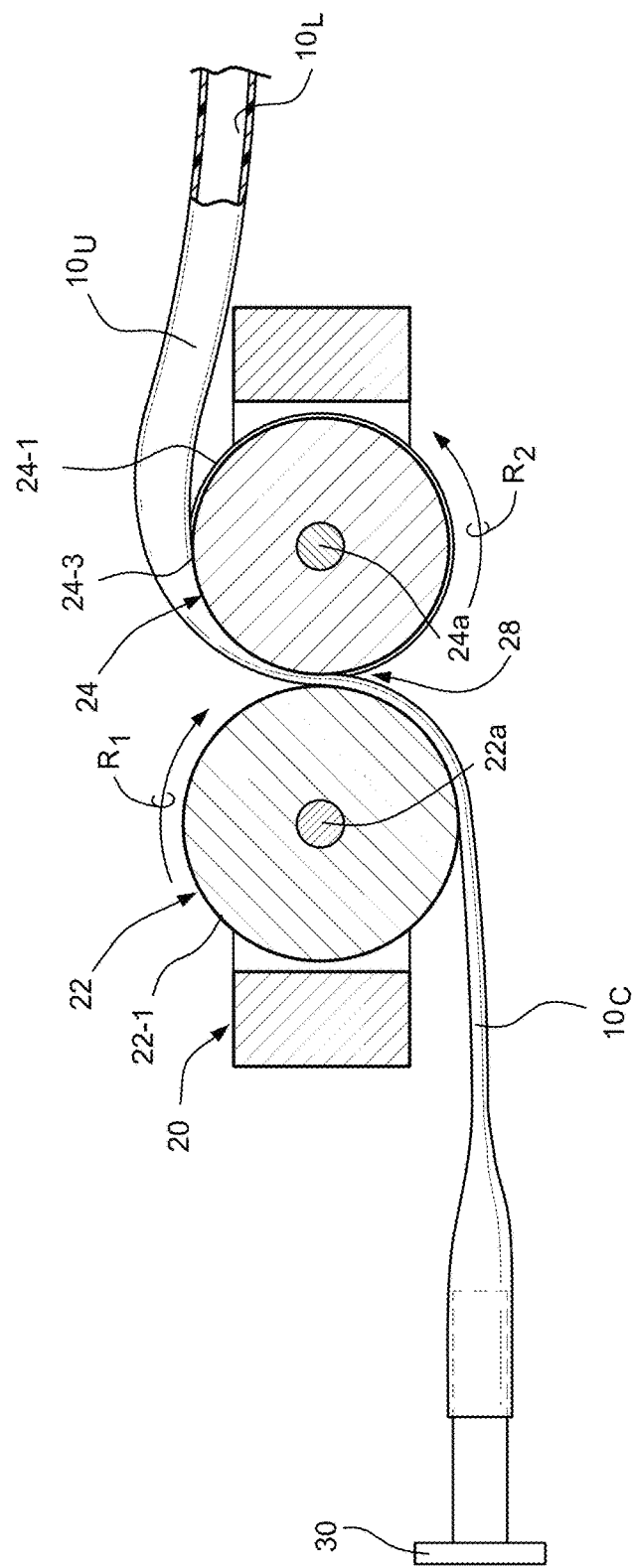
FIG. 2 is a cross-sectional view of the combination depicted in FIG. 1.
Figure 3A:
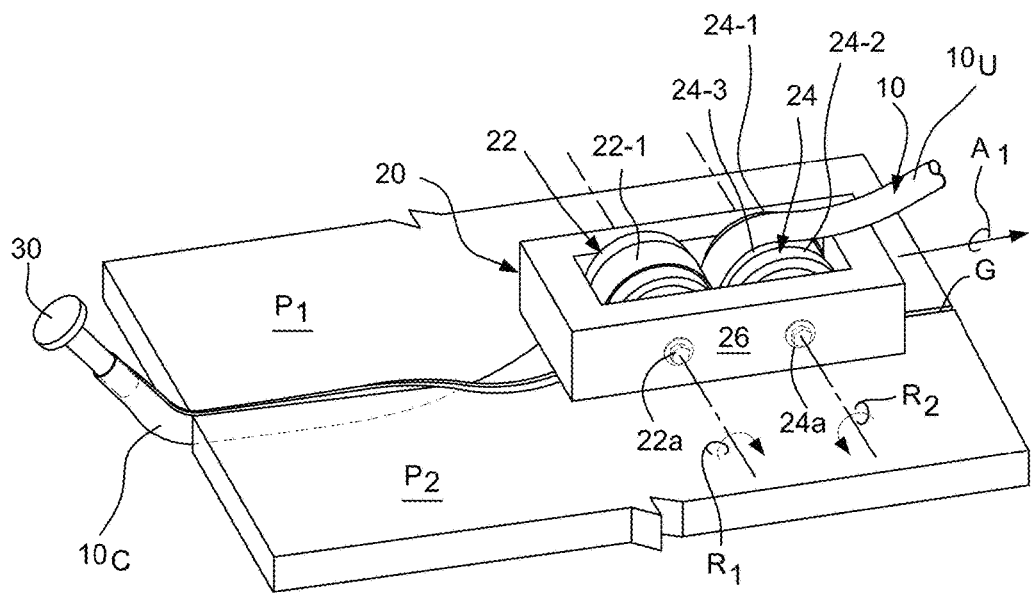
FIGS. 3A-3B are perspective schematic views showing an installation procedure using the combination depicted in FIG. 1 to seal a gap defined between an adjacent pair of structural panels.
Figure 3B:
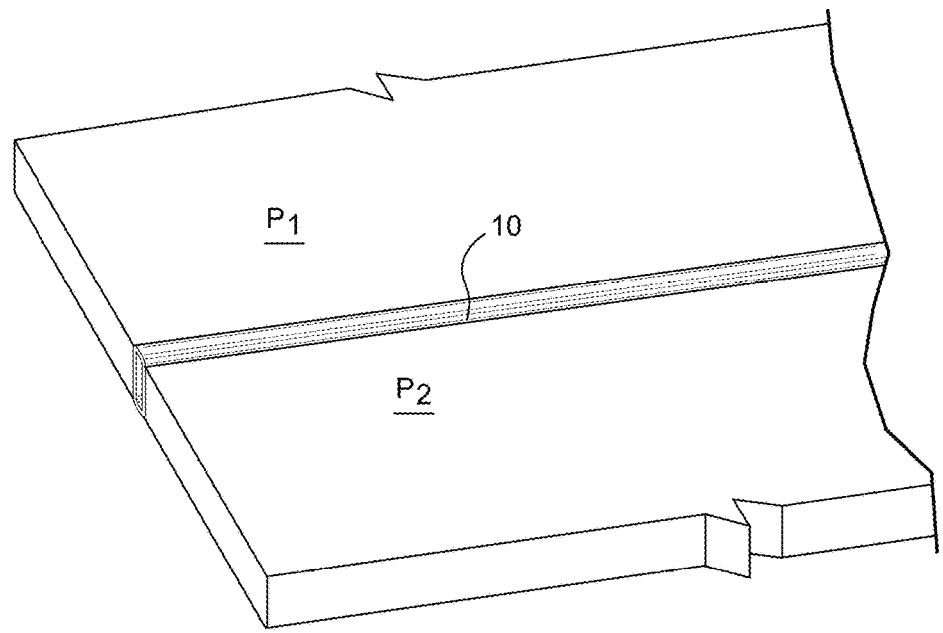

As can be seen in FIGS. 1 and 2, a device 20 is provided so as to assist in the installation of a preformed tubular seal profile 10 into a gap G defined a pair of structural panels P1, P2 (see FIGS. 3A and 3B). The preformed tubular seal profile 10 can be formed of virtually any compliant, flexible shape-retaining material suitable for the aerospace industry, such as tubular profiles formed of a thermoplastic elastomer, e.g., elastomeric polyolefins, polyurethanes, styrenic block copolymers, copolyesters and polyamides in addition to elastomeric alloys. The preformed tubular profile 10 can be provided in different sizes and cross-sectional configurations to suit the particular gap-sealing application that is desired.

The device 20 is generally comprised of a pair of opposed rollers 22, 24 mounted by corresponding axles 22a, 24a to the sides of a surrounding rectangular frame structure 26 so as to be counter-rotational relative to one another as shown by rotation arrows $R_1$, $R_2$. The rolls define therebetween a compression nip 28 (see FIG. 2) that is sized so as to accommodate the particular preformed tubular seal profile 10 being installed into the gap G between the panels P1, P2. In this regard, the axles 22a, 24a may be mounted in slots (not shown) defined in the sides of the frame 26 to allow for size-adjustment of the nip 28 therebetween (i.e., by allowing the rolls 22, 24 to be slightly adjustably moved towards and away from each other).

The roll 24 is provided with a pair of lateral raised annular guide bands 24-1, 24-2 which define therebetween a recessed annular roller surface 24-3. A raised central guide band 22-1 is provided with the roll 22 and is sized so as to be positioned between the raised annular guide bands 24-1, 24-2 of the roll 24. In such a manner, therefore, the cooperative annular guide bands 22-1, 24-1 and 24-2 close the nip space 28 which is sized to receive therein the preformed tubular elastomeric profile 10 therein. Such a closed nip space 28 thereby precludes the profile 10 from becoming skewed on the rolls 22, 24 during use of the device 10, i.e., the profile 10 is maintained within the nip space 28 between the rolls 22, 24 and does not track off of such rolls 22, 24.

In use, an end of the preformed tubular elastomeric profile 10 is introduced into the nip space 28 which causes the air within the central lumen 10L (see FIG. 2) of the tube to be expelled thereby pressing the side walls of the tubular profile against one another. A plug element 30 is then inserted into the terminal end of the compressed portion 10c of the profile 10. Continued advancement of the uncompressed portion 10u of the profile 10 through the nip space 28 will thereby create a correspondingly greater compressed portion 10c of the profile 10. That is, continual compression of the profile 10 will form a compressed portion 10c of the profile 10 by expressing air from the central lumen of the tubular preform thereby flattening the preform walls against one another (see FIG. 2).

The compressed portion 10c of the profile 10 may be formed by effecting relative movement between the device 20 and the profile 10. For example, the profile 10 may be held substantially stationary while moving the device 20 along the uncompressed portion 10u of the profile in a direction away from the plug element 30. Alternatively (or additionally), the compressed portion 10c of the profile may effectively be pulled causing the uncompressed portion 10u of the profile to be introduced into and compressed by the nip space 28.

An exemplary manner of installing the tubular profile 10 into a gap G between panels P1 and P2 is depicted schematically in FIGS. 3A and 3B. In this regard, it will be observed that a length of the compressed portion 10c of the tubular profile is shown as being inserted into the gap G while the device 20 is moved in the direction of arrow A1. Thus, as the device 20 moves along the uncompressed portion 10u of the profile 10 an additional length of the compressed portion 10c of the profile 10 will be formed which can then be inserted into the gap G.

Once the compressed portion 10c of the profile 10 has been inserted into the entire gap G to be sealed, the plug element 30 may be removed from the terminal end of the profile 10 thereby relieving the vacuum within the lumen of the profile 10 and causing the profile 10 to expand within the gap G. Any excess length of the profile 10 may be trimmed at the edges of the panels P1 and P2. The expanded profile 10 within the gap G thus seals the gap adequately against moisture ingress. Moreover, the profile 10 may be subsequently removed should the need arise and reused in the manner described above.

Various modifications within the skill of those in the art may be envisioned. Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A method for sealing a gap between adjacent structural panels comprising:
   (a) providing a preformed elastomeric tubular seal profile;
   (b) introducing the tubular seal profile into a nip space defined between an opposed pair of compression rollers mounted for counter-rotation relative to one another about respective horizontal rotational axes;
   (c) causing the tubular seal profile to be moved through the nip space to thereby cause the opposed pair of compression rollers to counter-rotate relative to one another about the horizontal respective rotational axes to thereby responsively compress the tubular seal profile therebetween and form a downstream compressed profile portion and an upstream uncompressed profile portion;
   (d) inserting the compressed profile portion into a gap defined between adjacent structural panels; and
   (e) causing the compressed profile portion to expand thereby sealing the gap between the adjacent structural panels.

2. The method according to claim 1, wherein step (b) includes inserting a plug element into a terminal end of the downstream compressed profile portion.

3. The method according to claim 1, wherein step (c) includes pulling the compressed profile portion through the nip space of the compression rollers.

4. The method according to claim 1, wherein step (c) comprises moving the compression rollers in a direction along the uncompressed portion of the profile.

5. The method according to claim 2, wherein step (e) includes removing the plug element to allow the downstream compressed profile portion to expand.

6. The method according to claim 1, further comprising removing an excess length of the tubular profile at edges of the adjacent panels.

7. A method for sealing a gap between adjacent structural panels comprising:
   (a) evacuating a central lumen of a compressible tubular seal profile by expelling air therefrom to cause side walls of the tubular seal profile to collapse and press against one another so as to form a compressed length of the tubular seal profile;
   (b) introducing the compressed length of the tubular seal profile into a gap defined between adjacent structural panels; and thereafter
   (c) causing the compressed length of the tubular seal profile to expand within the gap by reintroduction of air into the central lumen thereof to thereby allow the compressible tubular seal profile to seal the gap between the adjacent structural panels, wherein
   step (a) comprises the steps of:
      (a1) introducing the tubular seal profile into a nip space defined between a pair of opposed compression rollers mounted for counter-rotation relative to one another about horizontal respective rotational axes; and
      (a2) effecting relative movement between the nip space and the tubular seal profile to cause the opposed pair of compression rollers to counter-rotate relative to one another about the respective horizontal rotational axes to responsively expel air from and thereby evacuate the central lumen of the tubular seal profile.

8. The method according to claim 7, wherein step (a2) is practiced so as to form the compressed length of the tubular seal profile downstream of the nip space and an uncompressed length of the tubular seal profile upstream of the nip space.

9. The method according to claim 8, wherein step (a2) comprises inserting a plug element into a terminal end of the downstream compressed length of the tubular seal profile.

10. The method according to claim 7, wherein step (a2) includes pulling the compressed length of the tubular seal profile through the nip space of the compression rollers.

11. The method according to claim 7, wherein step (a2) comprises moving the compression rollers in a direction along an uncompressed length of the tubular seal profile.

12. The method according to claim 9, wherein step (c) comprises removing the plug element to allow the downstream compressed length of the tubular seal profile to expand within the gap.

13. The method according to claim 7, further comprising removing an excess length of the tubular profile at edges of the adjacent panels.

* * * * *